United States Patent
Shoji

(10) Patent No.: US 11,383,759 B2
(45) Date of Patent: Jul. 12, 2022

(54) MOTOR CONTROL APPARATUS

(71) Applicant: JTEKT CORPORATION, Osaka (JP)

(72) Inventor: Naoki Shoji, Uda (JP)

(73) Assignee: JTEKT CORPORATION, Osaka (JP)

( * ) Notice: Subject to any disclaimer, the term of this patent is extended or adjusted under 35 U.S.C. 154(b) by 169 days.

(21) Appl. No.: 16/521,659

(22) Filed: Jul. 25, 2019

(65) Prior Publication Data

US 2020/0039576 A1 Feb. 6, 2020

(30) Foreign Application Priority Data

Jul. 31, 2018 (JP) .............................. JP2018-144000

(51) Int. Cl.
*B62D 5/04* (2006.01)
*B62D 15/02* (2006.01)
(Continued)

(52) U.S. Cl.
CPC ........... *B62D 5/0463* (2013.01); *B62D 1/286* (2013.01); *B62D 6/003* (2013.01); *B62D 6/10* (2013.01); *B62D 15/025* (2013.01)

(58) Field of Classification Search
CPC ...... B62D 5/0463; B62D 1/286; B62D 6/003; B62D 6/10; B62D 15/025
See application file for complete search history.

(56) References Cited

U.S. PATENT DOCUMENTS

| 2015/0191199 A1* | 7/2015 | Tsubaki ............... B62D 15/025 701/42 |
| 2017/0274928 A1* | 9/2017 | Minaki ..................... B62D 5/04 |

(Continued)

FOREIGN PATENT DOCUMENTS

| EP | 2842833 A2 | 3/2015 |
| EP | 3213979 A1 | 9/2017 |

(Continued)

OTHER PUBLICATIONS

Dongpil Lee, Disturbance Adaptive Steering Wheel Torque Control for Enhanced Path Tracking of Autonomous Vehicles, 2017 (Year: 2017).*

(Continued)

*Primary Examiner* — Nicholas Kiswanto
*Assistant Examiner* — Jamal A Shah
(74) *Attorney, Agent, or Firm* — Oliff PLC

(57) ABSTRACT

A manual steering command value generation unit generates a manual steering command value, using a steering torque. A summed angle command value calculation unit calculates a summed angle command value, by adding the manual steering command value to an automatic steering command value. A control unit performs angle control of an electric motor, based on the summed angle command value. The control unit includes a basic torque command value calculation unit that calculates a basic torque command value, a disturbance torque estimation unit that estimates a disturbance torque other than a motor torque of the electric motor applied to an object driven by the electric motor, and a disturbance torque compensation unit that corrects the basic torque command value, based on the disturbance torque. The manual steering command value generation unit uses an estimated torque calculated based on the disturbance torque, when generating the manual steering command value.

5 Claims, 8 Drawing Sheets

(51) Int. Cl.
*B62D 6/10* (2006.01)
*B62D 6/00* (2006.01)
*B62D 1/28* (2006.01)

(56) References Cited

U.S. PATENT DOCUMENTS

2019/0263446 A1* 8/2019 Tsubaki .............. B62D 5/0463
2019/0315392 A1* 10/2019 Moulaire ............. B62D 5/0463

FOREIGN PATENT DOCUMENTS

| EP | 3321149 A1 | 5/2018 |
| JP | 2004-256076 A | 9/2004 |
| JP | 2008273226 A * | 11/2008 |
| WO | 2014/162769 A1 | 10/2014 |

OTHER PUBLICATIONS

Kyohei Koyama, Vehicular Steering Control Device, 2007 (Year: 2007).*

Jan. 14, 2020 European Search Report issued in European Patent Application No. 19189023.5.

* cited by examiner

MOTOR CONTROL APPARATUS

INCORPORATION BY REFERENCE

The disclosure of Japanese Patent Application No. 2018-144000 filed on Jul. 31, 2018 including the specification, drawings and abstract, is incorporated herein by reference in its entirety.

BACKGROUND OF THE INVENTION

1. Field of the Invention

The invention relates to a control apparatus for an electric motor for steering angle control.

2. Description of Related Art

In automated driving and assisted driving using an electric power steering system (EPS), a steer-by-wire system, a rear-wheel steering system, or other systems, the steered angle of steered wheels is controlled by an electric motor. In this type of motor control, angle feedback control is used that controls the motor torque of the electric motor, in accordance with the deviation between a target steered angle and an actual steered angle. In the angle feedback control, PID control is generally used. Specifically, a target torque is calculated by multiplying a term of the deviation between the target steered angle and the actual steered angle, an integral term of the deviation, and a differential term of the deviation, by a proportional gain, an integral gain, and a differential gain, respectively, and then adding these terms. Then, the electric motor is controlled such that the motor torque becomes equal to the target torque (see Japanese Patent Application Publication No. 2004-256076 and WO 2014/162769 Pamphlet).

The PID control described above is a linear control algorithm. Therefore, variations in non-linear disturbance torque, such as road surface load torque (disturbance torque on the rack shaft side), friction torque of a steering system, and steering torque (disturbance torque on the steering side), cause a decrease or variation in angle control accuracy.

SUMMARY OF THE INVENTION

An object of the present invention is to provide a motor control apparatus capable of reducing the influence of disturbance torque on angle control performance, and performing angle control with high accuracy.

According to an aspect of the present invention, there is provided a motor control apparatus that controls driving of an electric motor for steering angle control, the motor control apparatus including: a manual steering command value generation unit that generates a manual steering command value, using a steering torque; a summed angle command value calculation unit that calculates a summed angle command value, by adding the manual steering command value to an automatic steering command value; and a control unit that performs angle control of the electric motor, based on the summed angle command value; wherein the control unit includes a basic torque command value calculation unit that calculates a basic torque command value, based on the summed angle command value, a disturbance torque estimation unit that estimates a disturbance torque other than a motor torque of the electric motor applied to an object driven by the electric motor, and a disturbance torque compensation unit that corrects the basic torque command value, based on the disturbance torque; and the manual steering command value generation unit uses an estimated torque calculated based on the disturbance torque, when generating the manual steering command value.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
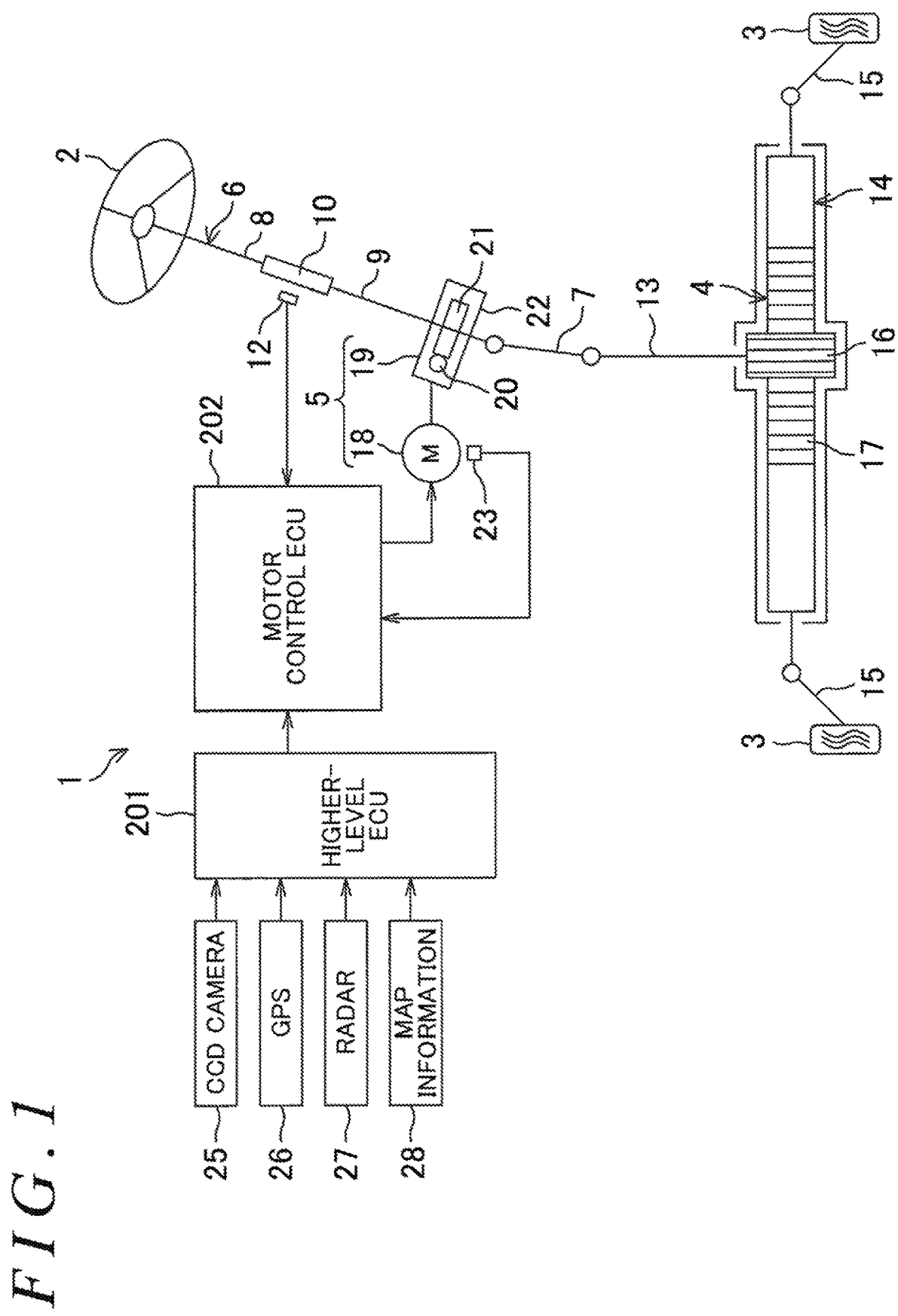
FIG. 1 is a schematic diagram illustrating the general configuration of an electric power steering system to which a motor control apparatus according to an embodiment of the present invention is applied.

Embodiments of the present invention will be described in detail below with reference to the accompanying drawings. FIG. 1 is a schematic diagram illustrating the general configuration of an electric power steering system to which a motor control apparatus according to an embodiment of the present invention is applied. An electric power steering system 1 includes a steering wheel 2, a steering operation mechanism 4, and a steering assist mechanism 5. The steering wheel 2 is a steering member for steering the vehicle. The steering operation mechanism 4 steers steered wheels 3 in conjunction with rotation of the steering wheel 2. The steering assist mechanism 5 assists the driver in steering. The steering wheel 2 and the steering operation mechanism 4 are mechanically coupled to each other via a steering shaft 6 and an intermediate shaft 7.

The steering shaft 6 includes an input shaft 8 coupled to the steering wheel 2, and an output shaft 9 coupled to the intermediate shaft 7, The input shaft 8 and the output shaft 9 are relatively rotatably coupled to each other via a torsion bar 10. A torque sensor 12 is disposed near the torsion bar 10. The torque sensor 12 detects a steering torque (torsion bar torque) $T_d$ applied to the steering wheel 2, based on the amount of relative rotational displacement between the input shaft 8 and the output shaft 9. In the present embodiment, the torque sensor 12 detects the steering torque $T_d$ for steering to the right as a positive value, and detects the steering torque $T_d$ for steering to the left as a negative value. The greater the absolute value of the steering torque $T_d$ is, the greater the magnitude of the steering torque $T_d$ is.

The steering operation mechanism 4 is a rack-and-pinion mechanism including a pinion shaft 13 and a rack shaft 14 that serves as a steered shaft. The steered wheels 3 are coupled to the opposite ends of the rack shaft 14 via tie rods 15 and knuckle arms (not illustrated). The pinion shaft 13 is coupled to the intermediate shaft 7. The pinion shaft 13 is configured to rotate in conjunction with steering of the steering wheel 2. A pinion 16 is coupled to the distal end of the pinion shaft 13.

The rack shaft 14 extends linearly in the lateral direction of the vehicle. A rack 17 that meshes with the pinion 16 is formed at an axially intermediate portion of the rack shaft 14. The pinion 16 and the rack 17 convert rotation of the pinion shaft 13 into axial movement of the rack shaft 14. The steered wheels 3 can be steered by moving the rack shaft 14 in the axial direction.

When the steering wheel 2 is operated (rotated), the rotation is transmitted to the pinion shaft 13 via the steering shaft 6 and the intermediate shaft 7. Then, the pinion 16 and the rack 17 convert rotation of the pinion shaft 13 into axial movement of the rack shaft 14. Thus, the steered wheels 3 are steered. The steering assist mechanism 5 includes an electric motor 18 and a reducer 19. The electric motor 18 generates a steering assist force (assist torque). The reducer 19 amplifies an output torque of the electric motor 18, and transmits the amplified torque to the steering operation mechanism 4. The reducer 19 is a worm gear mechanism including a worm gear 20 and a worm wheel 21 that meshes with the worm gear 20. The reducer 19 is housed in a gear housing 22 serving as a transmission mechanism housing. In the following, the reduction ratio (gear ratio) of the reducer 19 may be represented by N. The reduction ratio N is defined as a ratio ωwg/ωww of an angular velocity ωwg of the worm gear 20 to an angular velocity www of the worm wheel 21.

The worm gear 20 is rotationally driven by the electric motor 18. The worm wheel 21 is coupled to the output shaft 9 so as to be rotatable therewith. When the worm gear 20 is rotationally driven by the electric motor 18, the worm wheel 21 is rotationally driven. Thus, a motor torque is applied to the steering shaft 6, and the steering shaft 6 (output shaft 9) is rotated. The rotation of the steering shaft 6 is transmitted to the pinion shaft 13 via the intermediate shaft 7. The rotation of the pinion shaft 13 is converted into axial movement of the rack shaft 14. Thus, the steered wheels 3 are steered. That is, the electric motor 18 rotationally drives the worm gear 20, and thereby can assist in steering and steer the steered wheels 3. The electric motor 18 is provided with a rotation angle sensor 23 that detects a rotation angle of the electric motor 18.

The torque applied to the output shaft 9 (an example of an object driven by the electric motor 18) includes a motor torque of the electric motor 18, and a disturbance torque other than the motor torque. A disturbance torque $T_{lc}$ other than the motor torque includes the steering torque $T_d$, a road surface load torque (road surface reaction force torque) $T_{rl}$, and a friction torque $T_f$. The steering torque $T_d$ is torque applied to the output shaft 9 from the steering wheel 2 side, by the force applied to the steering wheel 2 by the driver, the force generated by inertia of steering, and so on.

The road surface load torque $T_{rl}$ is torque applied to the output shaft 9 via the rack shaft 14 from the steered wheels 3 side, by the self-aligning torque generated by the tire, the force generated by the suspension and tire wheel alignment, the friction force of a rack-and-pinion mechanism.

The friction torque $T_f$ is friction torque applied to the output shaft 9 (the object driven by the electric motor 18) and not included in the steering torque $T_d$ or the road surface load torque $T_{rl}$. The friction torque $T_f$ includes at least the friction torque generated between the electric motor 18 and the output shaft 9. In the present embodiment, the friction torque $T_f$ mainly includes the friction torque generated by the reducer 19 (friction torque generated between the worm wheel 21 and the worm gear 20).

The vehicle is equipped with a charge-coupled device (CCD) camera 25, a global positioning system (GPS) 26, a radar 27, and a map information memory 28. The CCD camera 25 takes a picture of the road ahead in the traveling direction of the vehicle. The GPS 26 detects the position of the vehicle. The radar 27 detects the road shape and an obstacle. The map information memory 28 stores map information. The CCD camera 25, the GPS 26, the radar 27, and the map information memory 28 are connected to a higher-level electronic control unit (ECU) 201 for performing assisted driving control and automated driving control. The higher-level ECU 201 performs surrounding environment recognition, own vehicle position estimation, route planning, and so on, based on the information obtained by the CCD camera 25, the GPS 26, and the radar 27, and the map information. Then, the higher-level ECU 201 determines control target values for steering and a drive actuator.

In the present embodiment, the higher-level ECU 201 sets an automatic steering command value $\theta_{adac}$ for automatic steering. In the present embodiment, the automatic steering control is, for example, control for causing the vehicle to travel along the target trajectory. The automatic steering command value $\theta_{adac}$ is a target value of the steering angle for causing the vehicle to automatically travel along the target trajectory. The processing for setting such an automatic steering command value $\theta_{adac}$ is well known and, therefore, will not be described herein in detail.

Figure 2:
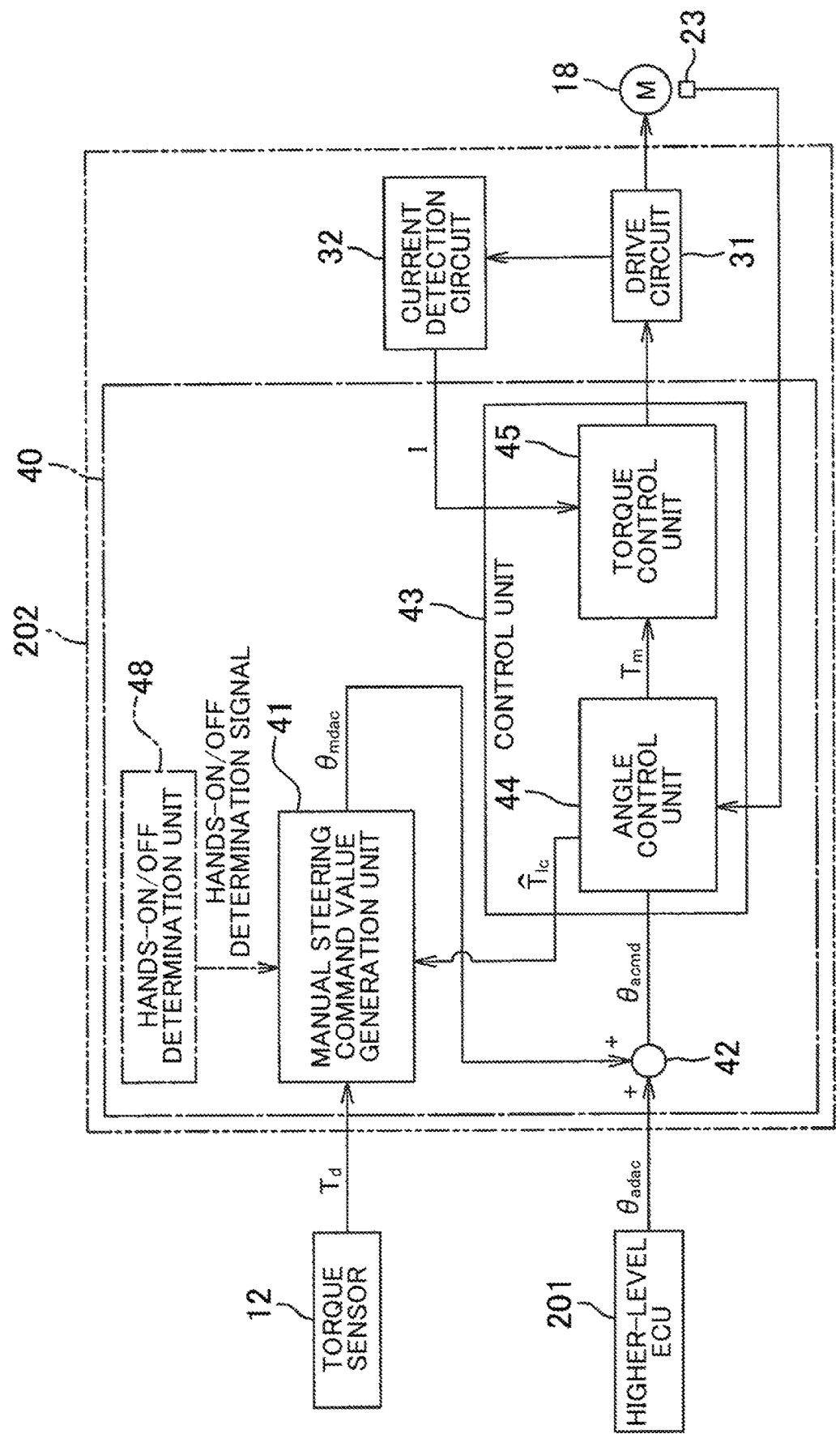
FIG. 2 is a block diagram illustrating the electrical configuration of a motor control ECU.

The automatic steering command value $\theta_{adac}$ set by the higher-level ECU 201 is transmitted to the motor control ECU 202 via an in-vehicle network. The steering torque $T_d$ detected by the torque sensor 12 and an output signal of the rotation angle sensor 23 are input to the motor control ECU 202. The motor control ECU 202 controls the electric motor 18, based on these input signals and the information provided from the higher-level ECU 201, FIG. 2 is a block diagram illustrating the electrical configuration of the motor control ECU 202.

The motor control ECU 202 includes a microcomputer 40, a drive circuit (inverter circuit) 31, and a current detection circuit 32. The drive circuit 31 is controlled by the microcomputer 40, and supplies power to the electric motor 18. The current detection circuit 32 detects a current flowing through the electric motor 18 (hereinafter referred to as a "motor current I").

The microcomputer 40 includes a CPU and memories (a ROM, a RAM, a non-volatile memory, and the like). The microcomputer 40 executes predetermined programs to serve as a plurality of function processing units. The plurality of function processing units include a manual steering command value generation unit 41, a summed angle command value calculation unit 42, and a control unit 43. The manual steering command value generation unit 41 is provided to set, when the driver operates the steering wheel 2, a steering angle (more correctly, a rotation angle θ of the output shaft 9) corresponding to the steering wheel operation as a manual steering command value $\theta_{mdac}$. The manual steering command value generation unit 41 generates the manual steering command value $\theta_{mdac}$, using the steering torque $T_d$ detected by the torque sensor 12 and a disturbance torque estimation value $\hat{T}_{lc}$ transmitted from an angle control unit 44 (described below) of the control unit 43.

The summed angle command value calculation unit 42 calculates a summed angle command value $\theta_{acmd}$ by adding the manual steeling command value $\theta_{mdac}$ to the automatic steering command value $\theta_{adac}$ set by the higher-level ECU 201.

The control unit 43 performs angle control of the electric motor 18, based on the summed angle command value $\theta_{acmd}$. More specifically, the control unit 43 controls driving of the drive circuit 31 such that the steering angle θ (the rotation angle θ of the output shaft 9) approaches the summed angle command value $\theta_{acmd}$.

Figure 3:
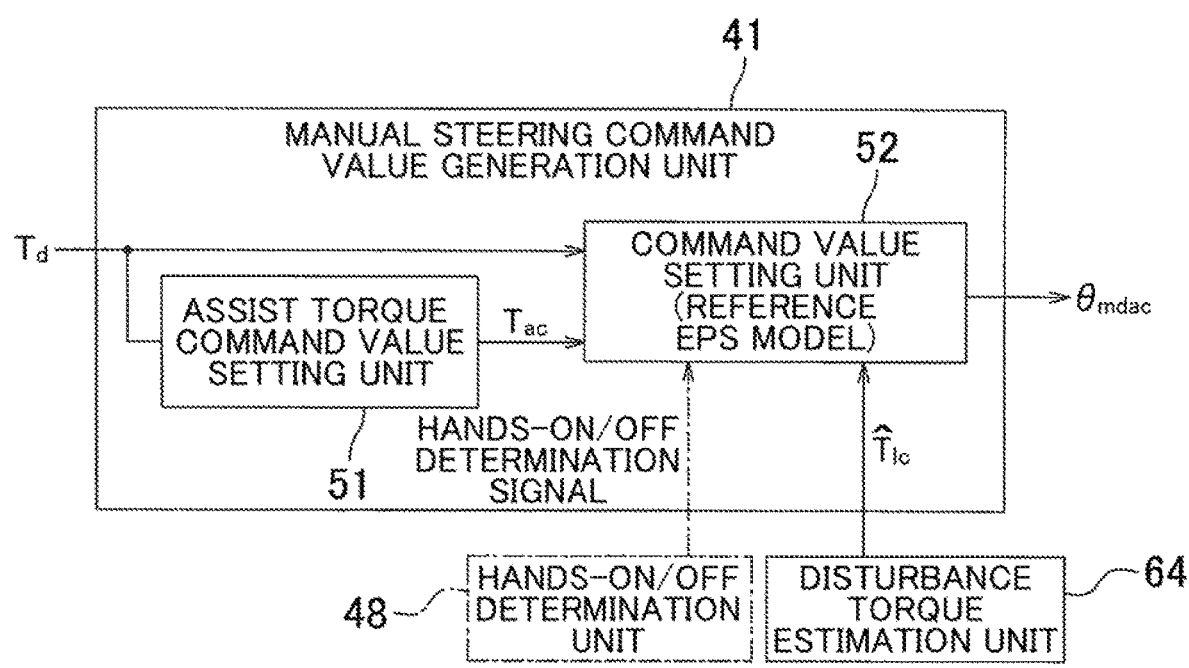
FIG. 3 is a block diagram illustrating the configuration of a manual steering command value generation unit.

The control unit 43 includes the angle control unit 44 and a torque control unit (current control unit) 45. The angle control unit 44 calculates a motor torque command value $T_m$ as the target value of the motor torque of the electric motor 18, based on the summed angle command value $\theta_{acmd}$. The torque control unit 45 drives the drive circuit 31 such that the motor torque of the electric motor 18 approaches the motor torque command value $T_m$. FIG. 3 is a block diagram illustrating the configuration of the manual steering command value generation unit 41.

Figure 4:
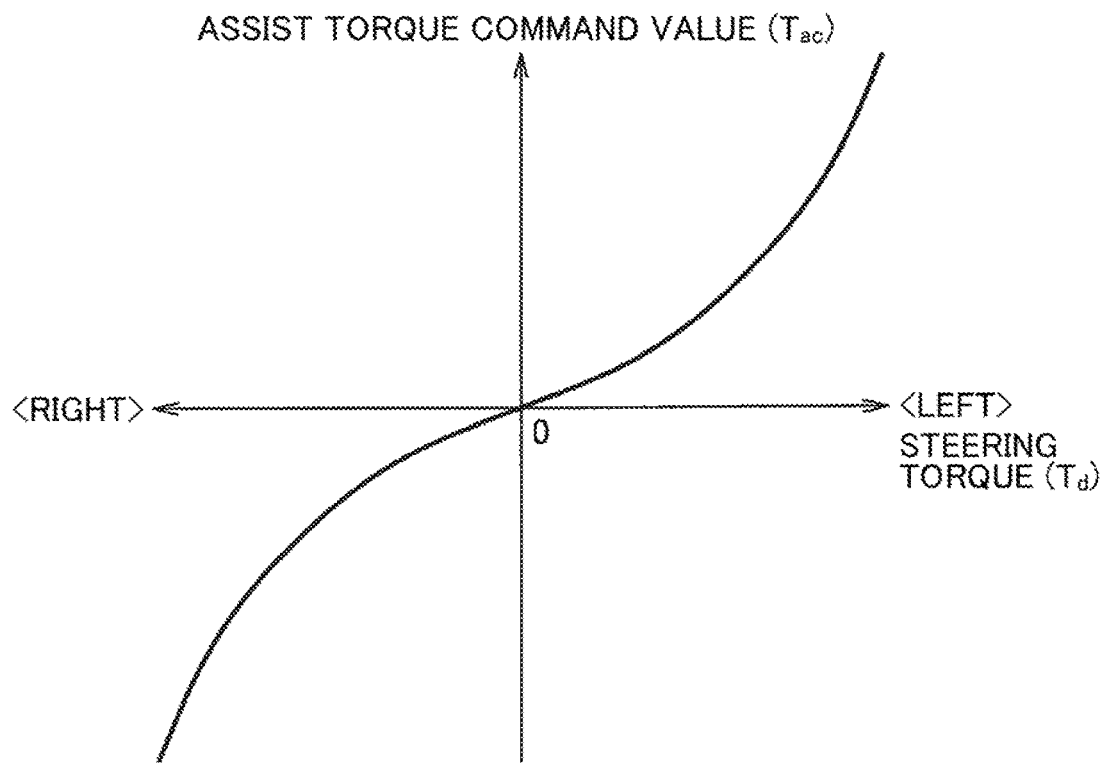
FIG. 4 is a graph illustrating an example setting of an assist torque command value $T_{ac}$ with respect to a steering torque $T_d$.

The manual steering command value generation unit 41 includes an assist torque command value setting unit 51 and a command value setting unit 52. The assist torque command value setting unit 51 sets an assist torque command value $T_{ac}$ as the target value of the assist torque required for manual operation. The assist torque command value setting unit Si sets the assist torque command value $T_{ac}$, based on the steering torque $T_d$ detected by the torque sensor 12. FIG. 4 illustrates an example setting of the assist torque command value $T_{ac}$ with respect to the steering torque $T_d$.

The assist torque command value $T_{ac}$ is set to a positive value when a steering assist force for steering to the left needs to be generated from the electric motor 18, and is set to a negative value when a steering assist force for steering to the right needs to be generated from the electric motor 18, The assist torque command value $T_{ac}$ is positive when the steering torque $T_d$ has a positive value, and negative when the steering torque $T_d$ has a negative value. The assist torque command value $T_{ac}$ is set such that its absolute value increases as the absolute value of the steering torque $T_d$ increases.

The assist torque command value setting unit 51 may calculate the assist torque command value $T_{ac}$, by multiplying the steering torque $T_d$ by a predetermined constant. Referring back to FIG. 3, the command value setting unit 52 sets the manual steering command value $\theta_{mdac}$, based on the steering torque $T_d$, the assist torque command value $T_{ac}$, and the disturbance torque estimation value $\hat{T}_{lc}$ calculated by a disturbance torque estimation unit 64 (described below) (see FIG. 6) of the angle control unit 44.

The disturbance torque estimation value $\hat{T}_{lc}$ calculated by the disturbance torque estimation unit 64 is the estimated value of the disturbance torque other than the motor torque applied to the object (output shaft 9) driven by the electric motor 18, The disturbance torque estimation value $\hat{T}_{lc}$ includes the steering torque $T_d$, the road surface load torque $T_{rl}$, and the friction torque $T_f$. The command value setting unit 52 basically sets the manual steering command value $\theta_{mdac}$, using a reference EPS model of FIG. 5.

Figure 5:
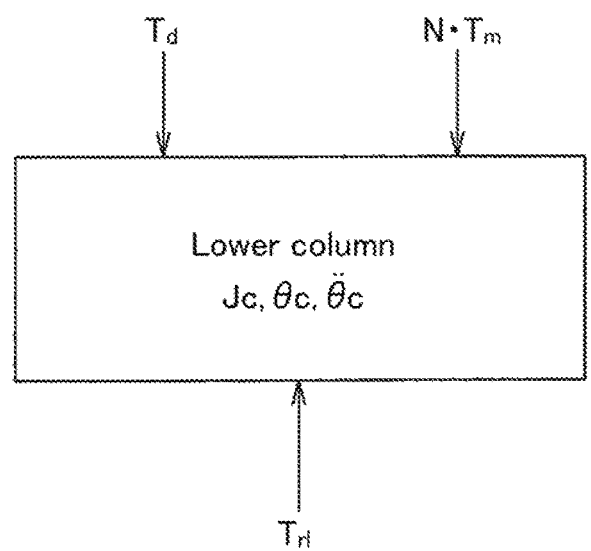
FIG. 5 is a schematic diagram illustrating an example of a reference EPS model used in a command value setting unit.

The reference EPS model is a single inertia model including a lower column. The lower column corresponds to the output shaft 9 and the worm wheel 21. In FIG. 5, $J_c$ represents the inertia of the lower column; $\theta_c$ represents the rotation angle of the lower column; and $T_d$ represents the steering torque. The lower column receives the steering torque $T_d$, a torque $N \cdot T_m$ applied from the electric motor 18 to the output shaft 9, and the road surface load torque $T_{rl}$.

The equation of motion of the reference EPS model is represented by the following Expression (1).

$$J_c \cdot d^2\theta_c/dt^2 = T_d + N \cdot T_m + T_{rl} \quad (1)$$

In the present embodiment, the command value setting unit 52 uses the disturbance torque estimation value $\hat{T}_{lc}$ calculated by the disturbance torque estimation unit 64 (see FIGS. 3 and 6), as the road surface load torque $T_{rl}$ of FIG. 5 ($T_{rl}$ in Expression (1)). In this case, the equation of motion of the reference EPS model is represented by the following Expression (2).

$$J_c \cdot d^2\theta_c/dt^2 = T_d + N \cdot T_m + \hat{T}_{rl} \quad (2)$$

The command value setting unit 52 solves the differential equation of Expression (2) by assigning the steering torque $T_d$ detected by the torque sensor 12 to $T_d$ and assigning the assist torque command value $T_{ac}$ set by the assist torque command value setting unit 51 to $N \cdot T_m$, and thereby calculates the rotation angle $\theta_c$ of the lower column. Then, the command value setting unit 52 sets the obtained rotation angle $\theta_c$ of the lower column as the manual steering command value $\theta_{mdac}$.

Figure 6:
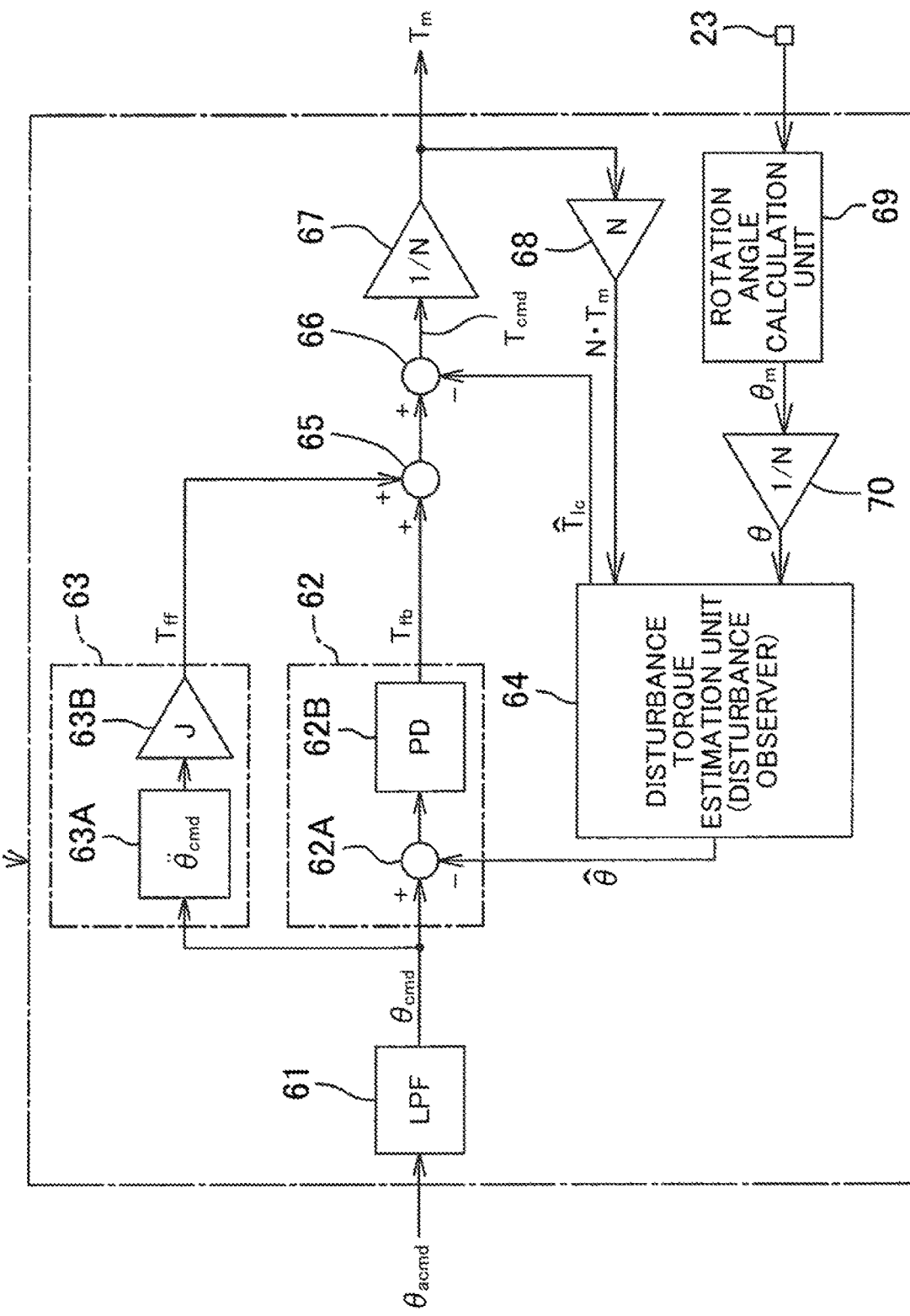
FIG. 6 is a block diagram illustrating the configuration of an angle control unit.

FIG. 6 is a block diagram illustrating the configuration of the angle control unit 44. The angle control unit 44 calculates the motor torque command value $T_m$ based on the summed angle command value $\theta_{acmd}$. The angle control unit 44 includes a low-pass filter (LPF) 61, a feedback control unit 62, a feedforward control unit 63, the disturbance torque estimation unit 64, a torque addition unit 65, a disturbance torque compensation unit 66, a first reduction ratio division unit 67, a reduction ratio multiplication unit 68, a rotation angle calculation unit 69, and a second reduction ratio division unit 70.

The reduction ratio multiplication unit 68 multiplies the motor torque command value $T_m$ calculated by the first reduction ratio division unit 67 by a reduction ratio N of the reducer 19. Thus, the motor torque command value $T_m$ is converted into a steering torque command value $T_{cmd}$ ($=N \cdot T_m$) applied to the output shaft 9 (worm wheel 21). The rotation angle calculation unit 69 calculates a rotor rotation angle $\theta_m$ of the electric motor 18, based on the output signal of the rotation angle sensor 23. The second reduction ratio division unit 70 divides the rotor rotation angle $\theta_m$ calculated by the rotation angle calculation unit 69 by the reduction ratio N. Thus, the rotor rotation angle $\theta_m$ is converted into a rotation angle (actual steering angle) θ of the output shaft 9.

The low-pass filter 61 performs low-pass filtering on the summed angle command value $\theta_{acmd}$. A summed angle command value $\theta_{cmd}$ resulting from low-pass filtering is transmitted to the feedback control unit 62 and the feed forward control unit 63. The feedback control unit 62 is provided to bring a steering angle estimation value $\hat{\theta}$ calculated by the disturbance torque estimation unit 64 closer to the summed angle command value $\theta_{cmd}$ resulting from the low-pass filtering. The feedback control unit 62 includes an angle deviation calculation unit 62A and a PD control unit 62B. The angle deviation calculation unit 62A calculates a deviation $\Delta\theta$ ($=\theta_{cmd}-\hat{\theta}$) between the summed angle command value $\theta_{cmd}$ and the steering angle estimation value $\hat{\theta}$. The angle deviation calculation unit 62A may calculate a deviation ($\theta_{cmd}-\hat{\theta}$) between the summed angle command value $\theta_{cmd}$ and the actual steering angle θ calculated by the second reduction ratio division unit 70, as the angle deviation $\Delta\theta$.

The PD control unit 62B performs a PD operation (proportional differential operation) on the angle deviation $\Delta\theta$ calculated by the angle deviation calculation unit 62A. Thus, a feedback control torque $T_{fb}$ is calculated. The feedback control torque $T_{fb}$ is transmitted to the torque addition unit 65. The feedforward control unit 63 is provided to compensate for delay in responsiveness due to the inertia of the electric power steering system 1, and improve control responsiveness. The feedforward control unit 63 includes an angular acceleration calculation unit 63A and an inertia multiplication unit 63B. The angular acceleration calculation unit 63A calculates a target angular acceleration $d^2\theta_{cmd}/dt^2$ by differentiating the summed angle command value $\theta_{cmd}$ twice.

The inertia multiplication unit 63B multiplies the target angular acceleration $d^2\theta_{cmd}/dt^2$ calculated by the angular acceleration calculation unit 63A, by an inertia J of the electric power steering system 1. Thus, a feedforward control torque $T_{ff}(=J \cdot d^2\theta_{cmd}/dt^2)$ is calculated. The inertia J is calculated from, for example, a physical model (described below) (see FIG. 7) of the electric power steering system 1. The feedforward control torque $T_{ff}$ is transmitted to the torque addition unit 65, as an inertia compensation value.

The torque addition unit 65 adds the feedforward control torque $T_{ff}$ to the feedback control torque $T_{fb}$. Thus, a basic torque command value $(T_{fb}, T_{ff})$ is calculated.

The disturbance torque estimation unit 64 is provided to estimate a non-linear torque (disturbance torque: torque other than the motor torque) generated as a disturbance in a plant (the object controlled by the electric motor 18). The disturbance torque estimation unit 64 estimates the disturbance torque (disturbance load) $T_{lc}$, the steering angle $\theta$, and a steering angle differential value (angular velocity) $d\theta/dt$, based on the steering torque command value $T_{cmd}(=N \cdot T_m)$ that is input to the plant and the actual steering angle $\theta$ that is output from the plant. The estimated values of the disturbance torque $T_{lc}$, the steering angle $\theta$, and the steering angle differential value (angular velocity) $d\theta/dt$ are represented by $\hat{T}_{lc}$, $\hat{\theta}$, and $d\hat{\theta}/dt$. The disturbance torque estimation unit 64 will be described in detail below.

The disturbance torque estimation value $\hat{T}_{lc}$ calculated by the disturbance torque estimation unit 64 is transmitted to the command value setting unit 52 (see FIG. 3) of the manual steering command value generation unit 41, and is also transmitted to the disturbance torque compensation unit 66 as a disturbance torque compensation value. The steering angle estimation value $\hat{\theta}$ calculated by the disturbance torque estimation unit 64 is transmitted to the angle deviation calculation unit 62A. The disturbance torque compensation unit 66 subtracts the disturbance torque estimation value $\hat{T}_{lc}$ from the basic torque command value $(T_{fb}+T_{ff})$. Thus, the steering torque command value $T_{cmd}(=T_{fb}+T_{ff}-\hat{T}_{lc})$ is calculated. In this manner, the steering torque command value (the torque command value for the output shaft 9) for which the disturbance torque is compensated is obtained.

The steering torque command value $T_{cmd}$ is transmitted to the first reduction ratio division unit 67. The first reduction ratio division unit 67 divides the steering torque command value $T_{cmd}$ by the reduction ratio N. Thus, the motor torque command value $T_m$ is calculated. The motor torque command value $T_m$ is transmitted to the torque control unit 45 (see FIG. 2). The disturbance torque estimation unit 64 will now be described in detail. The disturbance torque estimation unit 64 includes, for example, a disturbance observer that estimates the disturbance torque $T_{lc}$, the steering angle $\theta$, and the angular velocity $d\theta/dt$, using the physical model 101 of the electric power steering system 1 of FIG. 7.

The physical model 101 includes a plant (an example of an object driven by a motor) 102 including the output shaft 9 and the worm wheel 21 fixed to the output shaft 9. The plant 102 receives the steering torque $T_d$ from the steering wheel 2 via the torsion bar 10, and receives the road surface load torque $T_{rl}$ from the steered wheels 3 side. Further, the plant 102 receives the steering torque command value $T_{cmd}$ $(=N \cdot T_m)$ via the worm gear 20. The plant 102 also receives the friction torque $T_f$ due to the friction between the worm wheel 21 and the worm gear 20.

When the inertia of the plant 102 is represented by J, the motion equation of the inertia of the physical model 101 is represented by the following Expression (3).

$$J\ddot{\theta} = N \cdot T_m + T_{lc}$$

$$T_{lc} = T_d + T_{rl} + T_f \quad (3)$$

Here, $d^2\theta/dt^2$ represents the angular acceleration of the plant 102. N represents the reduction ratio of the reducer 19. $T_{lc}$ represents the disturbance torque applied to the plant 102 other than the motor torque. In the present embodiment, the disturbance torque $T_{lc}$ is represented as the sum of the steering torque $T_d$, the road surface load torque $T_{rl}$, and the friction torque $T_f$. In reality, however, the disturbance torque $T_{lc}$ includes torque other than these torques.

Figure 7:
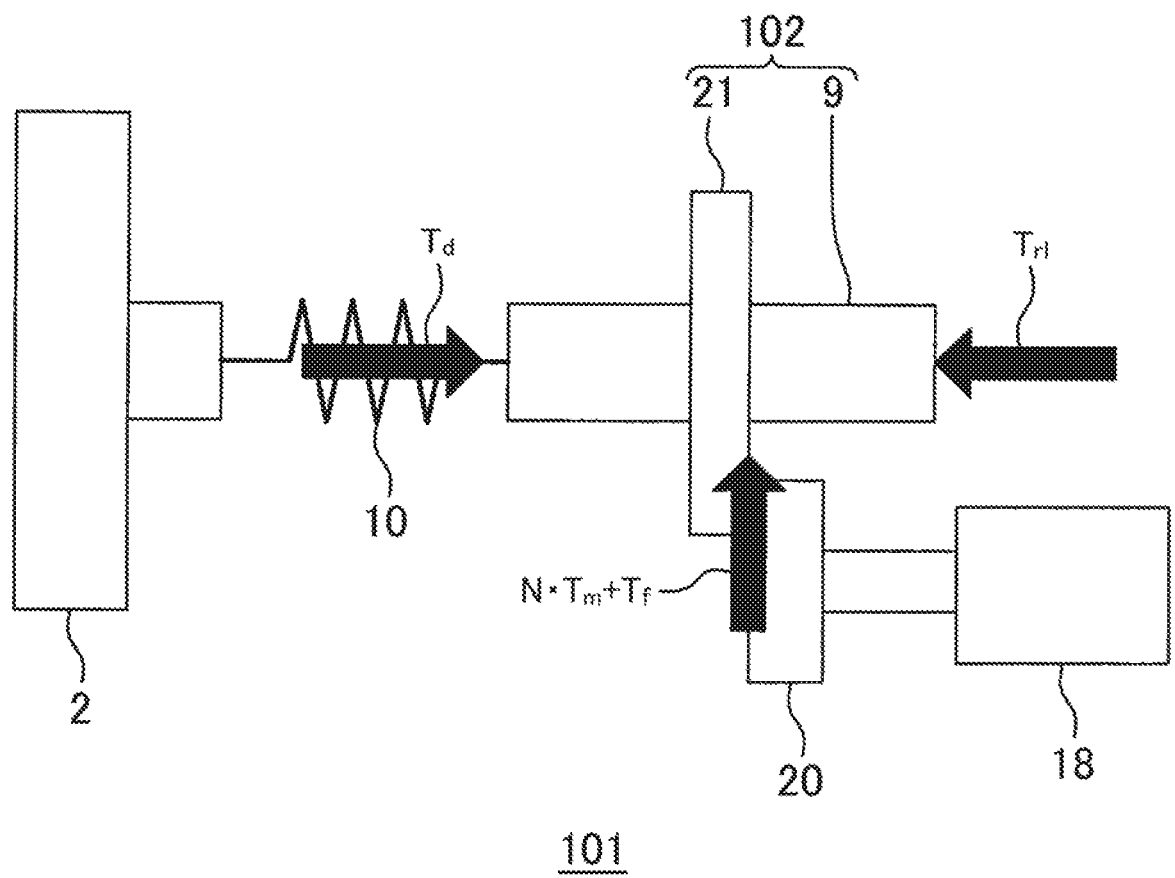
FIG. 7 is a schematic diagram illustrating an example of the configuration of a physical model of the electric power steering system.

The state equation for the physical model 101 of FIG. 7 is represented by the following Expression (4).

$$\begin{cases} \dot{x} = Ax + B_1 u_1 + B_2 u_2 \\ y = Cx + Du_1 \end{cases} \quad (4)$$

In the above Expression (4), x represents a state variable vector. In the above Expression (4), $u_1$ represents a known input vector. In the above Expression (4), $u_2$ represents an unknown input vector. In the above Expression (4), y represents an output vector (measured value). In the above Expression (4), A represents a system matrix. In the above Expression (4), $B_1$ represents a first input matrix. In the above Expression (4), $B_2$ represents a second input matrix. In the above Expression (4), C represents an output matrix. In the above Expression (4), D represents a feedthrough matrix.

The above state equation is extended to a system including the unknown input vector $u_2$ as one of the states. The state equation of an extended system (extended state equation) is represented by the following Expression (5).

$$\begin{cases} \dot{x}_e = A_e x_e + B_e u_1 \\ y = C_e x_e \end{cases} \quad (5)$$

In the above Expression (5), $x_e$ represents a state variable vector of the extended system, and is represented by the following Expression (6).

$$x_e = \begin{bmatrix} x \\ u_2 \end{bmatrix} \quad (6)$$

In the above Expression (5), $A_e$ represents a system matrix of the extended system. In the above Expression (5), $B_e$ represents a known input matrix of the extended system. In the above Expression (5), $C_e$ represents an output matrix of the extended system.

A disturbance observer (extended state observer) represented by the following Expression (7) is constructed from the extended state equation of the above Expression (5).

$$\begin{cases} \dot{\hat{x}}_e = A_e \hat{x}_e + B_e u_1 + L(y - \hat{y}) \\ \hat{y} = C_e \hat{x}_e \end{cases} \quad (7)$$

In Expression (7), $\hat{x}_e$, represents the estimated value of $x_e$. L represents an observer gain. Further, $\hat{y}$ represents the estimated value of y. Here, $\hat{x}_e$ is represented by the following Expression (8).

$$\hat{x}_e = \begin{bmatrix} \hat{\theta} \\ \dot{\hat{\theta}} \\ \hat{T}_{lc} \end{bmatrix} \quad (8)$$

In Expression (8), $\hat{\theta}$ is the estimated value of $\theta$, and $\hat{T}_{lc}$ is the estimated value of $T_{lc}$. The disturbance torque estimation unit 64 calculates the state variable vector $\hat{x}_e$ based on the equation of the above Expression (7).

Figure 8:
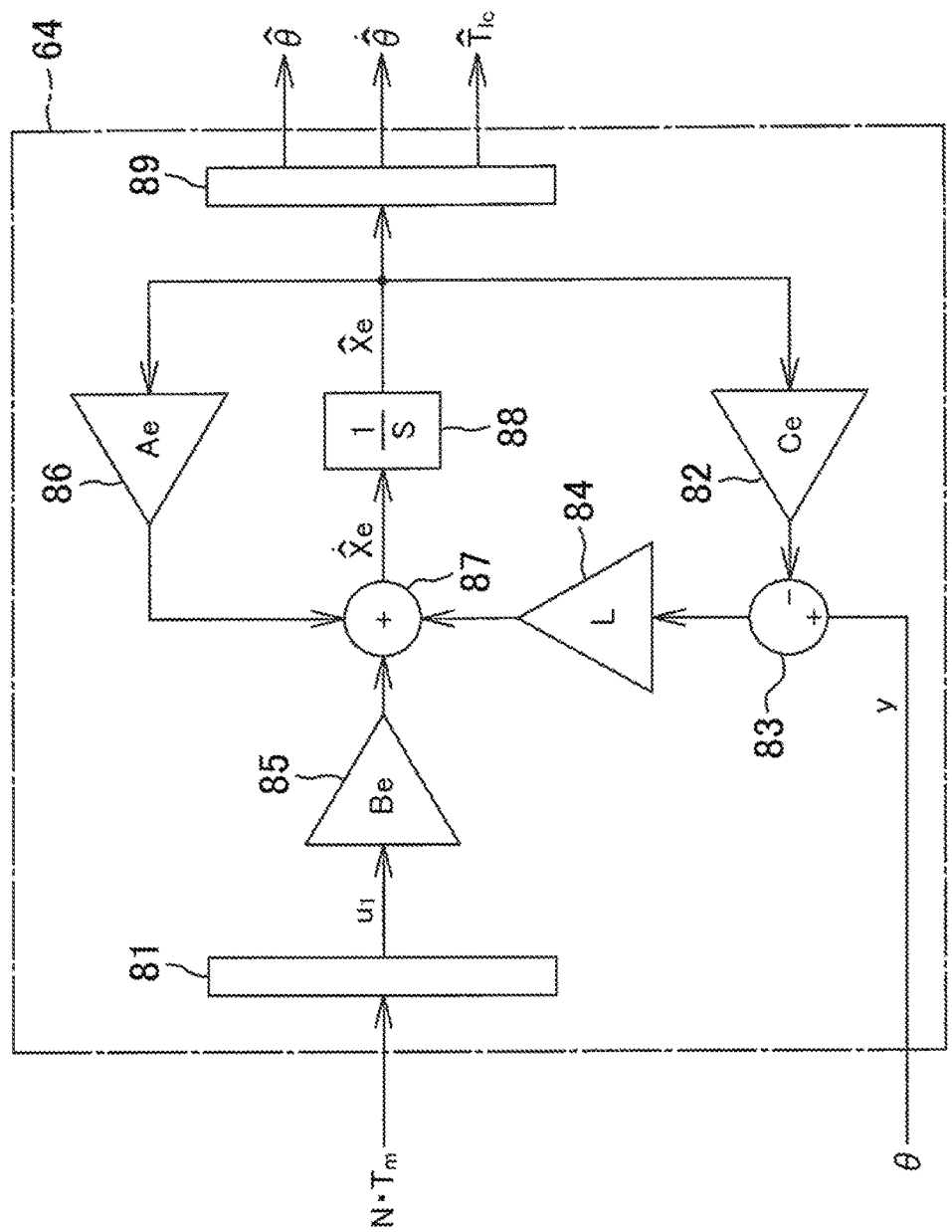
FIG. 8 is a block diagram illustrating the configuration of a disturbance torque estimation unit.

FIG. 8 is a block diagram illustrating the configuration of the disturbance torque estimation unit 64. The disturbance torque estimation unit 64 includes an input vector input unit 81, an output matrix multiplication unit 82, a first addition unit 83, a gain multiplication unit 84, an input matrix multiplication unit 85, a system matrix multiplication unit 86, a second addition unit 87, an integration unit 88, and a state variable vector output unit 89. The steering torque command value $T_{cmd}$ (=$N \cdot T_m$) calculated by the reduction ratio multiplication unit 68 (see FIG. 6) is transmitted to the input vector input unit 81. The input vector input unit 81 outputs an input vector $u_1$.

The output of the integration unit 88 is the state variable vector $\hat{x}_e$ (see the above Expression (8)). When starting a calculation, the initial value is given as the state variable vector $\hat{x}_e$. The initial value of the state variable vector $\hat{x}_e$ is, for example, 0. The system matrix multiplication unit 86 multiplies the state variable vector $\hat{x}_e$ by the system matrix $A_e$. The output matrix multiplication unit 82 multiplies the state variable vector $\hat{x}_e$ by the output matrix $C_e$.

The first addition unit 83 subtracts an output ($C_e \cdot \hat{x}_e$) of the output matrix multiplication unit 82 from the output vector (measured value) y as the actual steering angle $\theta$ calculated by the second reduction ratio division unit 70 (see FIG. 6). That is, the first addition unit 83 calculates the difference (y−$\hat{y}$) between the output vector y and the output vector estimation value $\hat{y}$ (=$C_e \cdot \hat{x}_e$). The gain multiplication unit 84 multiplies the output (y−$\hat{y}$) of the first addition unit 83 by the observer gain L (see the above Expression (7)).

The input matrix multiplication unit 85 multiplies the input vector $u_1$ output from the input vector input unit 81 by the input matrix $B_e$. The second addition unit 87 adds the output ($B_e \cdot u_1$) of the input matrix multiplication unit 85, the output ($A_e \cdot \hat{x}_e$) of the system matrix multiplication unit 86, and the output (L(y−$\hat{y}$)) of the gain multiplication unit 84. Thus, a differential value $d\hat{x}_e/dt$ of the state variable vector is calculated. The integration unit 88 integrates the output ($d\hat{x}_e/dt$) of the output of the second addition unit 87, Thus, the state variable vector $\hat{x}_e$ is calculated. The state variable vector output unit 89 calculates the disturbance torque estimation value $\hat{T}_{lc}$, the steering angle estimation value $\hat{\theta}$, and the angular velocity estimation value $d\hat{\theta}/dt$ based on the state variable vector $\hat{x}_e$.

Unlike the extended state observer described above, a general disturbance observer includes an inverse model of the plant and a low-pass filter. The motion equation of the plant is represented by Expression (3) as described above. Accordingly, the inverse model of the plant is represented by the following Expression (9).

$$T_{lc} = J \ddot{\theta} - N \cdot T_m \quad (9)$$

The input to a typical disturbance observer is $J \cdot d^2\theta/dt^2$ and $N \cdot T_m$, and is greatly affected by noise of the rotation angle sensor 23 because the second-order differential value of the actual steering angle $\theta$ is used. Meanwhile, the extended state observer described above estimates the disturbance torque based on integration, and therefore the influence of the noise due to differential can be reduced.

Figure 9:
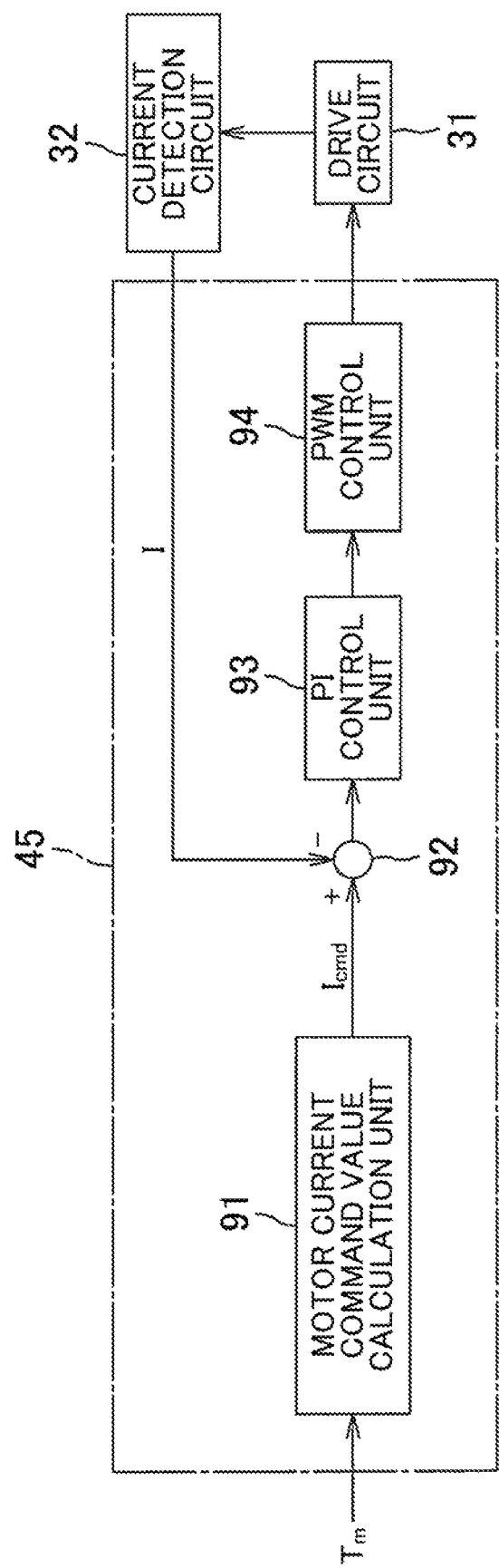
FIG. 9 is a schematic diagram illustrating the configuration of a torque control unit.

A typical disturbance observer including an inverse model of a plant and a low-pass filter may be used as the disturbance torque estimation unit 64. FIG. 9 is a schematic diagram illustrating the configuration of the torque control unit 45. The torque control unit 45 (see FIG. 2) includes a motor current command value calculation unit 91, a current deviation calculation unit 92, a PI control unit 93, and a pulse width modulation (PWM) control unit 94.

The motor current command value calculation unit 91 divides the motor torque command value $T_m$ calculated by the angle control unit 44 (see FIG. 2) by a torque constant $K_t$ of the electric motor 18. Thus, a motor current command value $I_{cmd}$ is calculated. The current deviation calculation unit 92 calculates a deviation $\Delta I$ (=$I_{cmd}$−I) between the motor current command value $I_{cmd}$ obtained by the motor current command value calculation unit 91 and the motor current I detected by the current detection circuit 32.

The PI control unit 93 performs a proportional integral (PI) operation on the current deviation $\Delta I$ calculated by the current deviation calculation unit 92. Thus, a drive command value for bringing the motor current I flowing through the electric motor 18 closer to the motor current command value $I_{cmd}$ is generated. The PWM control unit 94 generates a PWM control signal of a duty ratio corresponding to the drive command value, and supplies the PWM control signal to the drive circuit 31. Thus, power corresponding to the drive command value is supplied to the electric motor 18.

In the above embodiment, the summed angle command value $\theta_{acmd}$ is calculated by adding the manual steering command value $\theta_{mdac}$ to the automatic steering command value $\theta_{adac}$, and the electric motor 18 is controlled based on the summed angle command value $\theta_{acmd}$. Therefore, it is possible to achieve cooperative control that allows manual steering while performing steering control based mainly on automatic steering control, without switching between manual steering control and automatic steering control. Also, it is possible to seamlessly shift between manual steering control and automatic steering control, thereby not giving a sense of discomfort to the driver when steering manually.

In the above embodiment, the basic torque command value ($T_{fb}+T_{ff}$) is calculated based on the summed angle command value $\theta_{acmd}$, and the basic torque command value ($T_{fb}+T_{ff}$) is corrected by the disturbance torque estimation value $\hat{T}_{lc}$ calculated by the disturbance torque estimation unit 64. Therefore, it is possible to reduce the influence of the disturbance torque on the angle control performance. This makes it possible to perform angle control with high accuracy.

In the above embodiment, the manual steering command value $\theta_{mdac}$ is set using the disturbance torque estimation value $\hat{T}_{lc}$ calculated by the disturbance torque estimation unit 64 and including the road surface load torque $T_{rl}$. Therefore, it is possible to provide a steering feeling corresponding to the actual road surface conditions during manual steering. Hereinafter, modifications of the command value setting unit 52 (see FIG. 3) of the manual steering command value generation unit 41 will be described. In a first modification, the command value setting unit 52 uses the value $(\hat{T}_{lc}-T_d)$ obtained by subtracting the steering torque $T_d$ from the disturbance torque estimation value $\hat{T}_{lc}$ ($\approx T_d+T_{rl}+T_f$), as the road surface load torque $T_{rl}$ ($T_{rl}$ in the above Expression (1)) of FIG. 5.

In this case, the equation of motion of the reference EPS model of FIG. 5 is represented by the following Expression (10).

$$J_c \cdot d^2\theta_c/dt^2 = T_d + N \cdot T_m + (\hat{T}_{lc} - T_d) \quad (10)$$
$$= N \cdot T_m + \hat{T}_{lc}$$

The command value setting unit 52 solves the differential equation of Expression (10), by assigning the assist torque command value $T_{ac}$ set by the assist torque command value setting unit 51 (see FIG. 3) to $N \cdot T_m$. Thus, the rotation angle $\theta_c$ of the lower column is calculated. Then, the command value setting unit 52 sets the obtained rotation angle $\theta_c$ of the lower column as the manual steering command value $\theta_{mdac}$.

In the first modification, the manual steering command value $\theta_{mdac}$ is set using the value $(\hat{T}_{lc}-T_d)$ obtained by subtracting the steering torque $T_d$ from the disturbance torque estimation value $\hat{T}_{lc}$. Therefore, it is possible to prevent the steering torque $T_d$ included in the disturbance torque estimation value $\hat{T}_{lc}$ from being used for setting the manual steering command value $\theta_{mdac}$. Thus, it is possible to more effectively provide a steering feeling corresponding to the actual road surface conditions during manual steering. In a second modification, the command value setting unit 52 uses the value $(\hat{T}_{lc}-T_d-T_f)$ obtained by subtracting the steering torque $T_d$ and the friction torque $T_f$ from the disturbance torque estimation value $\hat{T}_{lc}$, as the road surface load torque $T_{rl}$ of FIG. 5. The friction torque $T_f$ can be estimated using, for example, a friction model that estimates friction generated in the reducer 19.

In this case, the equation of motion of the reference EPS model of FIG. 5 is represented by the following Expression (11).

$$J_c \cdot d^2\theta_c/dt^2 = T_d + N \cdot T_m + (\hat{T}_{lc} - T_d - T_f) \quad (11)$$
$$= N \cdot T_m + \hat{T}_{lc} - T_f$$

The command value setting unit 52 solves the differential equation of Expression (11), by assigning the assist torque command value $T_{ac}$ set by the assist torque command value setting unit 51 (see FIG. 3) to $N \cdot T_m$. Thus, the rotation angle $\theta_c$ of the lower column is calculated. Then, the command value setting unit 52 sets the obtained rotation angle $\theta_c$ of the lower column as the manual steering command value $\theta_{mdac}$.

In the second modification, the manual steering command value $\theta_{mdac}$ is set using the value $(\hat{T}_{lc}-T_d-T_f)$ obtained by subtracting the steering torque $T_d$ and the friction torque $T_f$ from the disturbance torque estimation value $\hat{T}_{lc}$. Therefore, it is possible to prevent the steering torque $T_d$ and the friction torque $T_f$ included in the disturbance torque estimation value $\hat{T}_{lc}$ from being used for setting the manual steering command value $\theta_{mdac}$. Thus, it is possible to more effectively provide a steering feeling corresponding to the actual road surface conditions during manual steering. In a third modification, the command value setting unit 52 uses the sum $(T_{vsd}+\hat{T}_{lc})$ of a virtual spring-damper load $T_{vsd}$ and the disturbance torque estimation value $\hat{T}_{lc}$, as the road surface load torque $T_{rl}$ of FIG. 5.

The virtual spring-damper load $T_{vsd}$ is represented by the following Expression (12), using a spring constant k and a viscous damping coefficient c.

$$T_{vsd} = -k \cdot \theta_c - c(d\theta/dt) \quad (12)$$

In this case, the equation of motion of the reference EPS model of FIG. 5 is represented by the following Expression (13).

$$J_c \cdot d^2\theta_c/dt^2 = T_d + N \cdot T_m + \{-k \cdot \theta_c - c(d\theta_c/dt)\} + \hat{T}_{lc} \quad (13)$$

Predetermined values obtained in advance through experiments and analyses are set as the spring constant k and the viscous damping coefficient c. The same applies to fourth to tenth modifications. The command value setting unit 52 solves the differential equation of Expression (13), by assigning the steering torque $T_d$ detected by the torque sensor 12 to $T_d$ and assigning the assist torque command value $T_{ac}$ set by the assist torque command value setting unit 51 (see FIG. 3) to $N \cdot T_m$. Thus, the rotation angle $\theta_c$ of the lower column is calculated. Then, the command value setting unit 52 sets the obtained rotation angle $\theta_c$ of the lower column as the manual steering command value $\theta_{mdac}$.

In the third modification, since the disturbance torque estimation value $\hat{T}_{lc}$ is used for setting the manual steering command value $\theta_{mdac}$, it is possible to provide a steering feeling corresponding to the actual road surface conditions during manual steering. Further, in the third modification, the virtual spring-damper load $T_{vsd}$ is used for setting the manual steering command value $\theta_{mdac}$. Therefore, a reaction force is generated that brings the manual steering command value $\theta_{mdac}$ back to zero when steering manually. Thus, even in the case where a manual operation is performed during automatic steering, the steering angle $\theta$ easily follows the automatic steering command value $\theta_{adac}$ when the manual operation is stopped. In a fourth modification, the command value setting unit 52 uses the sum $\{T_{vsd}+(\hat{T}_{lc}-T_d)\}$ of the virtual spring-damper load $T_{vsd}$ and the value $(\hat{T}_{lc}-T_d)$ obtained by subtracting the steering torque $T_d$ from the disturbance torque estimation value $\hat{T}_{lc}$ as the road surface load torque $T_{rl}$ of FIG. 5.

In this case, the equation of motion of the reference EPS model of FIG. 5 is represented by the following Expression (14).

$$J_c \cdot d^2\theta_c/dt^2 = T_d + N \cdot T_m + \{-k \cdot \theta_c - c(d\theta_c/dt)\} + (\hat{T}_{lc} - T_d) \quad (14)$$
$$= N \cdot T_m + \{-k \cdot \theta_c - c(d\theta_c/dt)\} + \hat{T}_{lc}$$

The command value setting unit 52 solves the differential equation of Expression (14), by assigning the assist torque command value $T_{ac}$ set by the assist torque command value setting unit 51 (see FIG. 3) to $N \cdot T_m$. Thus, the rotation angle $\theta_c$ of the lower column is calculated. Then, the command value setting unit 52 sets the obtained rotation angle $\theta_c$ of the lower column as the manual steering command value $\theta_{mdac}$. In the fourth modification, the same effects as those of the third modification can be obtained.

In a fifth modification, the command value setting unit 52 uses the sum $\{T_{vsd}+(\hat{T}_{lc}-T_d-T_f)\}$ of the virtual spring-damper load $T_{vsd}$ and the value $(\hat{T}_{lc}-T_d-T_f)$ obtained by subtracting the steering torque $T_d$ and the friction torque $T_f$ from the disturbance torque estimation value $\hat{T}_{lc}$, as the road surface load torque $T_{rl}$ of FIG. 5. The friction torque $T_f$ can be estimated using, for example, a friction model that estimates friction generated in the reducer 19.

In this case, the equation of motion of the reference EPS model of FIG. 5 is represented by the following Expression (15).

$$J_c \cdot d^2\theta_c/dt^2 = T_d + N \cdot T_m + \{-k \cdot \theta_c - c(d\theta_c/dt)\} + \qquad (15)$$
$$(\hat{T}_{lc} - T_d - T_f)$$
$$= N \cdot T_m + \{-k \cdot \theta_c - c(d\theta_c/dt)\} + \hat{T}_{lc} + T_f$$

The command value setting unit 52 solves the differential equation of Expression (15), by assigning the assist torque command value $T_{ac}$ set by the assist torque command value setting unit 51 (see FIG. 3) to $N \cdot T_m$. Thus, the rotation angle $\theta_c$ of the lower column is calculated. Then, the command value setting unit 52 sets the obtained rotation angle $\theta_c$ of the lower column as the manual steering command value $\theta_{mdac}$. In the fifth modification, the same effects as those of the third modification can be obtained.

The disturbance torque estimation value $\hat{T}_{lc}$ calculated by the disturbance torque estimation unit 64 (see FIG. 6) includes the road surface load torque $T_{rl}$. The road surface load torque $T_{rl}$ includes a steady component (self-aligning torque) for bringing the steering angle back to a neutral position (straight driving position), and variation components such as road surface disturbance torque (for example, disturbance torque due to rocks on the road, and irregularities of the road surface) and friction torque of the rack-and-pinion mechanism. The steady component is the low-frequency component of the road surface load torque $T_{rl}$ included in the disturbance torque estimation value $\hat{T}_{lc}$, and the variation component is a high-frequency component of the road surface load torque $T_{rl}$.

In a sixth modification, the command value setting unit 52 uses the sum $\{T_{vsd}+HPF(\hat{T}_{lc})\}$ of the virtual spring-damper load $T_{vsd}$ and the high-frequency component HPF $(\hat{T}_{lc})$ of the disturbance torque estimation value $\hat{T}_{lc}$, as the road surface load torque $T_{rl}$ of FIG. 5. The high-frequency component HPF $(\hat{T}_{lc})$ of the disturbance torque estimation value $\hat{T}_{lc}$ can be obtained by extracting only the frequency component with a frequency higher than a predetermined frequency from the frequency components of the disturbance torque estimation value $\hat{T}_{lc}$, using a high-pass filter.

In this case, the equation of motion of the reference EPS model of FIG. 5 is represented by the following Expression (16).

$$J_c \cdot d^2\theta_c/dt^2 = T_d + N \cdot T_m + \{-k \cdot \theta_c - c(d\theta_c/dt)\} + HPF(\hat{T}_{lc}) \qquad (16)$$

The command value setting unit 52 solves the differential equation of Expression (16), by assigning the steering torque $T_d$ detected by the torque sensor 12 to $T_d$ and assigning the assist torque command value $T_{ac}$ set by the assist torque command value setting unit 51 (see FIG. 3) to $N \cdot T_m$. Thus, the rotation angle $\theta_c$ of the lower column is calculated. Then, the command value setting unit 52 sets the obtained rotation angle $\theta_c$ of the lower column as the manual steering command value $\theta_{mdac}$.

In the sixth modification, the virtual spring-damper load $T_{vsd}$ is used for setting the manual steering command value $\theta_{mdac}$. Therefore, a reaction force is generated that brings the manual steering command value $\theta_{mdac}$ back to zero when steering manually. Meanwhile, the low-frequency component (steady component) of the disturbance torque estimation value $\hat{T}_{lc}$ is not used for setting the manual steering command value $\theta_{mdac}$. Therefore, as compared to the third to fifth modifications described above, the reaction force that brings the steering angle to the neutral position (straight driving position) when steering manually is reduced. Thus, even in the case where a manual operation is performed during automatic steering, the steering angle more easily follows the automatic steering command value $\theta_{adac}$ when the manual operation is stopped.

Further, in the sixth modification, the high-frequency component HPF $(\hat{T}_{lc})$ of the disturbance torque estimation value $\hat{T}_{lc}$ is used for setting the manual steering command value $\theta_{mdac}$. Thus, the road surface disturbance torque and the friction torque of the rack-and-pinion mechanism are used for setting the manual steering command value $\theta_{mdac}$, so that it is possible to provide a steering feeling corresponding to the actual road surface conditions during manual steering. In a seventh modification, the command value setting unit 52 uses the sum $\{T_{vsd}+HPF(\hat{T}_{lc}-T_d)\}$ of the virtual spring-damper load $T_{vsd}$ and the high-frequency component HPF $(\hat{T}_{lc}-T_d)$ of the value $(\hat{T}_{lc}-T_d)$ obtained by subtracting the steering torque $T_d$ from the disturbance torque estimation value $\hat{T}_{lc}$, as the road surface load torque $T_{rl}$ of FIG. 5. HPF $(\hat{T}_{lc}-T_d)$ can be obtained by extracting only the frequency component with a frequency higher than a predetermined frequency from the frequency components of $(\hat{T}_{lc}-T_d)$, using a high-pass filter.

In this case, the equation of motion of the reference EPS model of FIG. 5 is represented by the following Expression (17).

$$J_c \cdot d^2\theta_c/dt^2 = T_d + N \cdot T_m + \{-k \cdot \theta_c - c(d\theta_c/dt)\} + HPF(\hat{T}_{lc} - T_d) \qquad (17)$$

The command value setting unit 52 solves the differential equation of Expression (17), by assigning the steering torque $T_d$ detected by the torque sensor 12 to $T_d$ and assigning the assist torque command value $T_{ac}$ set by the assist torque command value setting unit 51 (see FIG. 3) to $N \cdot T_m$. Thus, the rotation angle $\theta_c$ of the lower column is calculated. Then, the command value setting unit 52 sets the obtained rotation angle $\theta_c$ of the lower column as the manual steering command value $\theta_{mdac}$. In the seventh modification, the same effects as those of the sixth modification can be obtained.

In an eighth modification, the command value setting unit 52 uses the sum $\{T_{vsd}+HPF(\hat{T}_{lc}-T_d-T_f)\}$ of the virtual spring-damper load $T_{vsd}$ and the high-frequency component HPF $(\hat{T}_{lc}-T_d-T_f)$ of the value $(\hat{T}_{lc}-T_d-T_f)$ obtained by subtracting the steering torque $T_d$ and the friction torque $T_f$ from the disturbance torque estimation value $\hat{T}_{lc}$, as the road surface load torque $T_{rl}$ of FIG. 5.

The friction torque $T_f$ can be estimated using, for example, a friction model that estimates friction generated in the reducer 19. HPF $(\hat{T}_{lc}-T_d-T_f)$ can be obtained by extracting only the frequency component with a frequency higher than a predetermined frequency from the frequency components of $(\hat{T}_{lc}-T_d-T_f)$, using a high-pass filter. In this case, the equation of motion of the reference EPS model of FIG. 5 is represented by the following Expression (18).

$$J_c \cdot d^2\theta_c/dt^2 = T_d + T_m + \{-k \cdot \theta_c - c(d\theta_c/dt)\} + HPF(\hat{T}_{lc} - T_d - T_f) \quad (18)$$

The command value setting unit 52 solves the differential equation of Expression (18), by assigning the steering torque $T_d$ detected by the torque sensor 12 to $T_d$ and assigning the assist torque command value $T_{ac}$ set by the assist torque command value setting unit 51 (see FIG. 3) to $N \cdot T_m$. Thus, the rotation angle $\theta_c$ of the lower column is calculated. Then, the command value setting unit 52 sets the obtained rotation angle $\theta_c$ of the lower column as the manual steering command value $\theta_{mdac}$. In the eighth modification, the same effects as those of the sixth modification can be obtained.

In a ninth modification, the command value setting unit 52 uses the sum $\{T_{vsd} + HPF(\hat{T}_{lc}) - T_d\}$ of the virtual spring-damper load $T_{vsd}$ and the value $\{HPF(\hat{T}_{lc}) - T_d\}$ obtained by subtracting the steering torque $T_d$ from the high-frequency component HPF $(\hat{T}_{lc})$ of the disturbance torque estimation value $\hat{T}_{lc}$, as the road surface load torque $T_{rl}$ of FIG. 5.

In this case, the equation of motion of the reference EPS model of FIG. 5 is represented by the following Expression (19).

$$J_c \cdot d^2\theta_c/dt^2 = T_d + N \cdot T_m + \{-k \cdot \theta_c - c(d\theta_c/dt)\} + \quad (19)$$
$$\{HPF(\hat{T}_{lc}) - T_d\}$$
$$= N \cdot T_m + \{-k \cdot \theta_c - c(d\theta_c/dt)\} + HPF(\hat{T}_{lc})$$

The command value setting unit 52 solves the differential equation of Expression (19), by assigning the assist torque command value $T_{ac}$ set by the assist torque command value setting unit 51 (see FIG. 3) to $N \cdot T_m$. Thus, the rotation angle $\theta_c$ of the lower column is calculated. Then, the command value setting unit 52 sets the obtained rotation angle $\theta_c$ of the lower column as the manual steering command value $\theta_{mdac}$. In the ninth modification, the same effects as those of the sixth modification can be obtained.

In a tenth modification, the command value setting unit 52 uses the sum $\{T_{vsd} + HPF(\hat{T}_{lc}) - T_d - T_f\}$ of the virtual spring-damper load $T_{vsd}$ and the value $\{HPF(\hat{T}_{lc}) - T_d - T_f\}$ obtained by subtracting the steering torque $T_d$ and the friction torque $T_f$ from the high-frequency component HPF $(\hat{T}_{lc})$ of the disturbance torque estimation value $\hat{T}_{lc}$, as the road surface load torque $T_{rl}$ of FIG. 5. The friction torque $T_f$ can be estimated using, for example, a friction model that estimates friction generated in the reducer 19.

In this case, the equation of motion of the reference EPS model of FIG. 5 is represented by the following Expression (20).

$$J_c \cdot d^2\theta_c/dt^2 = T_d + N \cdot T_m + \{-k \cdot \theta_c - c(d\theta_c/dt)\} + \quad (20)$$
$$\{HPF(\hat{T}_{lc}) - T_d - T_f\}$$
$$= N \cdot T_m + \{-k \cdot \theta_c - c(d\theta_c/dt)\} + HPF(\hat{T}_{lc}) - T_f$$

The command value setting unit 52 solves the differential equation of Expression (20), by assigning the assist torque command value $T_{ac}$ set by the assist torque command value setting unit 51 (see FIG. 3) to $N \cdot T_m$. Thus, the rotation angle $\theta_c$ of the lower column is calculated. Then, the command value setting unit 52 sets the obtained rotation angle $\theta_c$ of the lower column as the manual steering command value $\theta_{mdac}$. In the tenth modification, the same effects as those of the sixth modification can be obtained.

In the case where any of the first modification to the tenth modification is used, when a determination is made that the driver is not holding the steering wheel 2, each of a steering torque $T_{tb}$, the torque $N \cdot T_m$ applied from the electric motor 18 to the output shaft 9, and an estimated torque based on the disturbance torque estimation value $\hat{T}_{lc}$ may be set to zero.

The estimated torque based on the disturbance torque estimation value $\hat{T}_{lc}$ is $\hat{T}_{lc}$ of the above Expression (13), $(\hat{T}_{lc} - T_d)$ of the above Expression (14), $(\hat{T}_{lc} - T_d - T_f)$ of the above Expression (15), HPF $(\hat{T}_{lc})$ of the above Expression (16), HPF $(\hat{T}_{lc} - T_d)$ of the above Expression (17), HPF $(\hat{T}_{lc} - T_d - T_f)$ of the above Expression (18), $\{HPF(\hat{T}_{lc}) - T_d\}$ of the above Expression (19), or $\{HPF(\hat{T}_{lc}) - T_d - T_f\}$ of the above Expression (20).

Specifically, as indicated by the long dashed short dashed line in FIGS. 2 and 3, a hands-on/off determination unit 48 is provided that determines whether the driver is holding the steering wheel 2 (hands-on) or not holding the steering wheel 2 (hands-off). The hands-on/off determination unit 48 may be one that determines whether the hands are on the steering wheel 2 based on an output signal of a touch sensor provided on the steering wheel 2, or may be one that determines whether the hands are on the steering wheel 2 based on an image captured by a camera provided in the vehicle. Note that the hands-on/off determination unit 48 is not limited to those described above, and may be any unit that can determine whether the hands are on the steering wheel 2.

A hands-on/off determination signal output from the hands-on/off determination unit 48 is transmitted to the command value setting unit 52. When the hands-on/off determination unit 48 determines that the driver is holding the steering wheel 2, the command value setting unit 52 calculates the manual steering command value $\theta_{mdac}$, using the estimated torque based on the disturbance torque estimation value $\hat{T}_{lc}$. That is, the command value setting unit 52 calculates the manual steering command value $\theta_{mdac}$ (=$\theta_c$) based on any of the above Expressions (13) to (20).

On the other hand, when the hands-on/off determination unit 48 determines that the driver is not holding the steering wheel 2, the command value setting unit 52 solves the differential equation by assigning zero to each of the steering torque $T_{tb}$, $N \cdot T_m$, and the estimated torque based on the disturbance torque estimation value $\hat{T}_{lc}$ in any of the above Expressions (13) to (20). Thus, the manual steering command value $\theta_{mdac}$ (=$\theta_c$) is calculated. In this modification, when the driver is not manually steering, the steering torque $T_{tb}$ that is input to the manual steering command value generation unit 41 is set to substantially zero. Also, the estimated torque based on the disturbance torque estimation value $\hat{T}_{lc}$ is set to zero for calculation of the manual steering command value $\theta_{mdac}$. Thus, it is possible to prevent the manual steering command value $\theta_{mdac}$ from being set based on disturbance other than the driver torque when the driver is not manually steering.

In the other modifications described above, when a determination is made that the driver is not holding the steering wheel 2, each of the steering torque $T_{tb}$, the torque $N \cdot T_m$ applied from the electric motor 18 to the output shaft 9, and the estimated torque based on the disturbance torque estimation value $\hat{T}_{lc}$ is set to zero. However, when a determination is made that the driver is not holding the steering wheel 2, only the estimated torque based on the disturbance torque estimation value $\hat{T}_{lc}$ out of the steering torque $T_{tb}$, the torque $N \cdot T_m$ applied from the electric motor 18 to the output shaft 9, and the estimated torque based on the disturbance torque estimation value $\hat{T}_{lc}$ may be set to zero, or the steering torque $T_{tb}$ and the estimated torque based on the disturbance torque estimation value $\hat{T}_{lc}$ may be set to zero.

While an embodiment of the present invention has been described above, the present invention may be practiced in other embodiments. For example, although the angle control unit 44 (see FIG. 6) includes the feedforward control unit 63 in the above embodiments, the feedforward control unit 63 may be omitted. In this case, the feedback control torque $T_{fb}$ calculated by the feedback control unit 62 is used as the basic torque command value.

In the above embodiments, the disturbance torque estimation unit 64 calculates the disturbance torque estimation value $\hat{T}_{lc}$ based on the motor torque command value $T_m$ and the rotation angle θ of the plant. However, a motor torque acquisition unit that acquires a motor torque generated by the electric motor 18 may be provided, and the motor torque acquired by the motor torque acquisition unit may be used in place of the motor torque command value $T_m$. In the above embodiments, the present invention is applied to motor control of a column assist type EPS. However, the present invention may be applied to motor control of EPS other than those of the column assist types. The present invention may be applied to controlling an electric motor for steering angle control of a steer-by-wire system.

Further, various modifications can be made to the present invention within the scope of the appended claims.

What is claimed is:

1. A motor control apparatus that controls driving of an electric motor for steering angle control, the motor control apparatus comprising:
   a processor programed to
   generate a manual steering command value using a steering torque;
   calculate a summed angle command value by adding the manual steering command value to an automatic steering command value;
   perform angle control of the electric motor based on the summed angle command value;
   calculate a basic torque command value based on the summed angle command value;
   estimate an estimated disturbance torque other than a motor torque of the electric motor applied to an object driven by the electric motor, the estimated disturbance torque including the steering torque, a road surface load torque, and a friction torque;
   correct the basic torque command value based on the estimated disturbance torque; and
   use the estimated disturbance torque as an input of an equation of motion of a reference model to generate the manual steering command value, the reference model being an inertia model including a portion of a column of a steering system.

2. The motor control apparatus according to claim 1, wherein the processor generates the manual steering command value further using a virtual spring-damper load.

3. The motor control apparatus according to claim 2, wherein the road surface load torque is one of (i) a value obtained by subtracting the steering torque from a high-frequency component of the estimated disturbance torque having a frequency higher than a predetermined frequency and (ii) a value obtained by subtracting the steering torque and the friction torque from the high-frequency component of the estimated disturbance torque.

4. The motor control apparatus according to claim 1, wherein the road surface load torque is calculated using a virtual spring-damper load and a high-frequency component of the estimated disturbance torque having a frequency higher than a predetermined frequency.

5. The motor control apparatus according to claim 1, wherein the manual steering command value is generated further using one of (i) a value obtained by subtracting the steering torque from the estimated disturbance torque and (ii) a value obtained by subtracting the steering torque and the friction torque from the estimated disturbance torque.

\* \* \* \* \*